P. N. LANDINE.
WIND SHIELD.
APPLICATION FILED SEPT. 8, 1915. RENEWED SEPT. 24, 1917.
1,265,680.
Patented May 7, 1918.
2 SHEETS—SHEET 1.
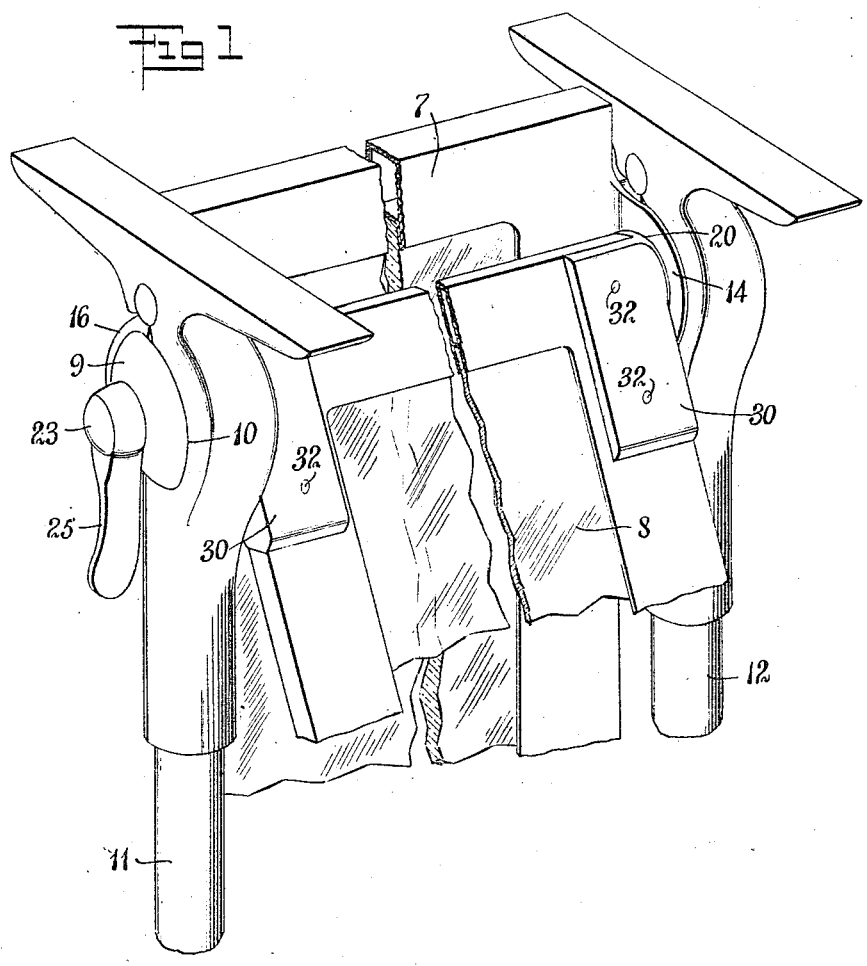
Inventor
Peter N. Landine

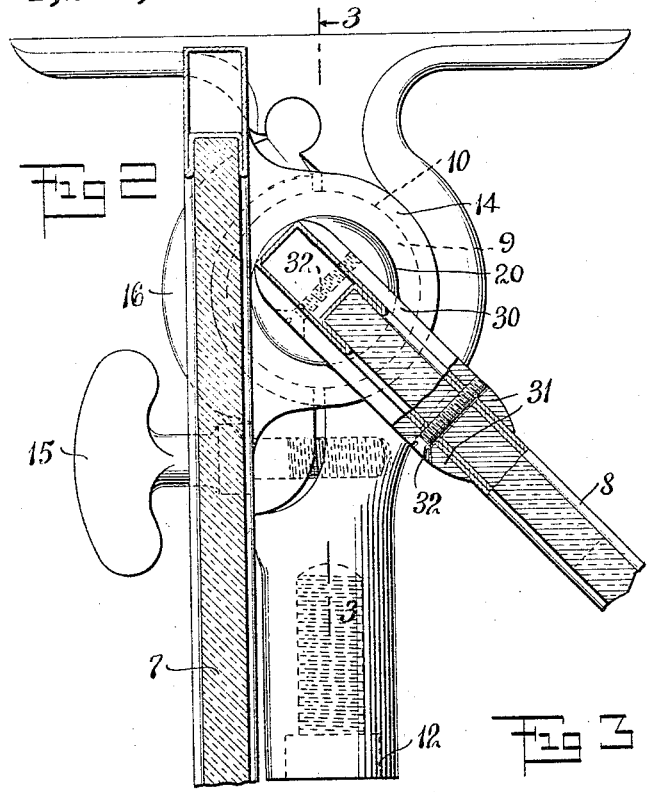
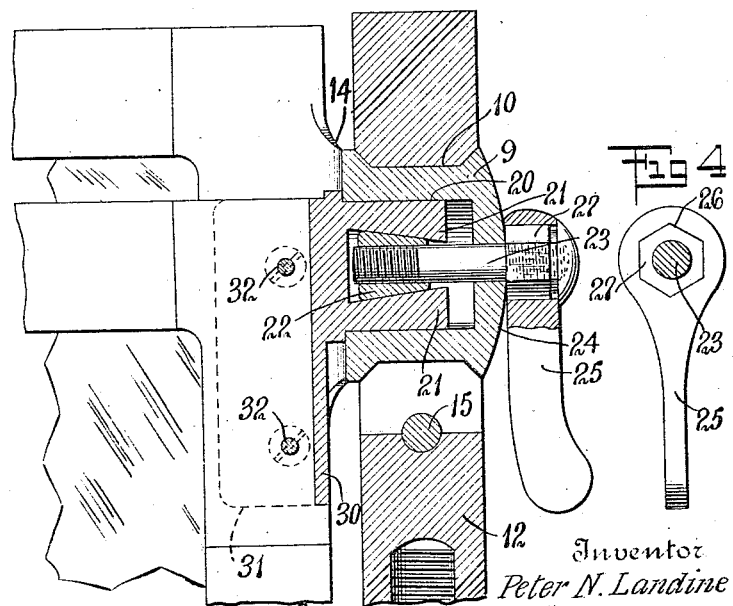

UNITED STATES PATENT OFFICE.

PETER N. LANDINE, OF MILFORD, CONNECTICUT, ASSIGNOR TO THE ROSTAND MANUFACTURING COMPANY, OF MILFORD, CONNECTICUT, A CORPORATION OF CONNECTICUT.

WIND-SHIELD.

1,265,680.      Specification of Letters Patent.      Patented May 7, 1918.

Application filed September 8, 1915, Serial No. 49,512. Renewed September 24, 1917. Serial No. 193,032.

*To all whom it may concern:*

Be it known that I, PETER N. LANDINE, a citizen of the United States of America, residing at Milford, Connecticut, have invented a new and useful Wind-Shield, of which the following is a specification.

My present invention aims to provide simple and effective means for mounting the windshield sections and to facilitate the setting of the windshield sections in different angular relations.

A special object is to provide a readily adjustable rain guard for the windshield proper.

These objects I have accomplished by supporting one of the windshield sections on hubs journaled on the windshield standards or supports and the other windshield section on hubs journaled in the hubs of the first windshield section. The second windshield section may be adjusted angularly in relation to the first windshield section by swinging it on its hub and the first windshield section or both sections as a unit may be adjusted by swinging the first windshield section on its supporting hubs. Means are provided for holding the windshield sections in their adjusted relation, such means preferably being in the form of adjustable clamps.

A special feature of the invention is the utilization of the second windshield section as a rain guard and which when set at an angle overhanging the face of the first windshield section effectually protects the face of said windshield section from rain, sleet, snow, etc.

A further feature is the provision of means whereby the rain guard section may be readily removed from its hub brackets when said rain guard is not needed or when repairs are to be made.

Various other features and the details of construction will appear as the specification proceeds.

In the accompanying drawings I have illustrated a practical and preferred embodiment of my invention but it will be understood that various changes and modifications may be made without departing from the true spirit and scope of the invention.

In these drawings:—

Figure 1, is a broken perspective view looking at the front of a windshield having the features of my invention embodied therein.

Fig. 2, is a vertical sectional view taken on a plane at the right-hand end of Fig. 1.

Fig. 3, is a sectional view taken on a plane substantially at right angles to the plane of Fig. 2, on the plane of the line 3—3, of said Fig. 2.

Fig. 4, is a detail view of the operating handle of one of the clamp screws.

In the present illustration the first windshield section 7 is shown applied as a windshield proper and the second windshield section 8 is shown used as a rain guard for the first windshield section.

The first windshield section or member is supported by means of hubs 9 at the opposite ends thereof journaled in sockets 10 in the upright stanchions or supports 11 and 12. These supporting hubs are preferably off-set forwardly beyond the central plane of the windshield section, as clearly shown in Figs. 1 and 2, they being for this purpose carried by the forwardly off-set brackets 14.

The first windshield section, is, in the present instance held in its adjusted relation on the supporting standard by means of screws 15 which clamp the movable segments 16 of the hub sockets 10 into gripping engagement with the hubs.

The second windshield section, which in this case constitutes the rain guard, is supported by means of end hubs 20 journaled in the supporting hubs of the first windshield section, the hubs of the first windshield section being made hollow as shown in Fig. 3 to receive the hubs of the second windshield section.

The second windshield section is adjusted angularly in respect to the first windshield section or in respect to the supporting standard by simply swinging it on its supporting hubs and suitable means are provided for holding it in the position to which it is adjusted. This holding means is in the present instance in the form of a clamp provided by splitting the end of the hub 20 to provide the spaced yielding hub sections 21 which can be expanded into gripping engagement with the inner wall of the tubular supporting hub 9 in which it fits, by means of a wedging member 22 which is operated by a screw 23. This screw is shown passed in through the outer closed end 24 of the tubular socket 9 into engagement with the wedging member 22 and having a bearing against the said closed end 24 whereby it is enabled to draw the wedging member outward so as to expand the hub sections. The clamp screw 23 is operated by a suitable hand-hold, this hand-hold being here in the form of a lever 25, the head of which is socketed at 26 to fit the angular head 27 on the outer end of the clamp bolt or screw.

Preferably clamps or securing devices will be provided for holding both ends of the windshield sections but for light windshields holding devices at one end only may suffice. It will be evident that upon releasing the holding device or devices the windshield sections may be freely adjusted relative to each other and then be secured in their adjusted relations by setting up their holding devices into holding position.

As it may be desirable at times to remove the rain guard, I have provided for this contingency by making the hub sections of said rain guard in the form of brackets to which the rain guard is detachably secured. These hub brackets are designated 30 and are shown constructed with spaced holding arms 31 between which the rain guard is engaged and is detachably held in place by screws 32 passed through the frame of the rain guard and engaged in said spaced holding arms, all as indicated in Fig. 2. It will be evident that the removal of the holding screw 32 will permit the rain guard to be readily detached from its supporting brackets.

Fig. 2 illustrates how the off-set supporting brackets of the first windshield section provide clearance to allow practically any angular adjustment of the second windshield member.

By means of my invention the windshield sections can be readily adjusted with respect to each other and set in any desired angular direction or by simply releasing the holding means for the first windshield section, the two windshield sections may be adjusted angularly in relation to the supporting standard as a single unit. Aside from the advantages of ready adjustability to meet various different conditions, it will be seen that the invention possesses the added advantages of simplicity and inexpensiveness of construction and neatness in appearance.

What I claim is:—

1. A wind shield comprising supports having bearings, a shield member having tubular hubs journaled in the bearings on said supports, means for securing said shield member in various angularly adjusted relations on the supports, a second shield member having hubs journaled directly in the tubular hubs of the first shield member and supported directly by said tubular hubs, and means for securing the hubs of the second shield member in adjusted relations in the outer tubular supporting hubs of the first shield member while said outer tubular hubs are free to rotate in their bearings in the standards, whereby while the second shield member is thus locked to the first shield member, the first shield member may be rocked in its bearings to adjust both the shield members, and whereby the second shield member may be set at different angles with respect to the first shield member without changing the adjustment of the first shield member with respect to the supports.

2. A wind shield comprising supports having bearings, a shield member having tubular hubs journaled in the bearings on said supports, means for securing the shield member in angularly adjusted relations on the supports, hub brackets journaled directly in the tubular hubs of the shield member, clamping means for securing one of said hub brackets in angularly adjusted relations within the tubular hub in which it is mounted, and a second shield member detachably secured to the hub brackets, whereby the second shield member may be secured in different angular relations with respect to the first shield member and the first shield member may be rocked in its bearings on the supports to vary the relation of both the shield members, and whereby the second shield member may be detached from its supporting hub brackets without disturbing the first shield member.

3. A wind shield comprising supports, a shield member having tubular hubs journaled in said supports, said tubular hubs being open at their inner ends and one of said hubs having a closed outer end, clamping means engaging one of the tubular hubs to thereby hold the shield member in various angularly adjusted relations on the supports, a second shield member having hubs entered in the open inner ends of the tubular hubs of the first shield member and supported directly thereby and adapted to swivel freely therein, the hub thus swiveled in the closed end tubular hub of the first shield member including clamping means for direct engagement with the inner walls of said tubular hub in which it is housed and operating means for said clamping means having a bearing on the closed outer end of the tubular hub.

4. A wind shield comprising supporting standards each provided with an open hub socket, a wind shield member having tubular hubs seated in said open hub sockets, a second wind shield member having hubs journaled directly within and supported by the tubular hubs of the first wind shield member, means for securing the second shield member in adjusted relation to the first shield member while the first shield member is free for adjustment in the hub sockets whereby by swinging the first shield member on its tubular hubs both the shield members may be adjusted as a unit, and whereby the second shield member may be adjusted with respect to the first shield member independently of the adjustment of the first shield member on the supports, clamping segments engaging over the tubular hubs seated in the open hub sockets, and means for clamping said segments on the tubular hubs adapted also to release said clamping segments whereby upon release of said clamping segments the first shield member carrying with it the second shield member may be freely adjusted or both the shield members may be removed as a unit from the supports.

PETER N. LANDINE.

Copies of this patent may be obtained for five cents each, by addressing the "Commissioner of Patents, Washington, D. C."